US007172358B1

(12) United States Patent
Rudelius et al.

(10) Patent No.: US 7,172,358 B1
(45) Date of Patent: Feb. 6, 2007

(54) COUNTING PEN

(75) Inventors: Thomas William Rudelius, McLean, VA (US); Steven James Rudelius, McLean, VA (US)

(73) Assignee: Noble Logistics, LLC, McLean, VA (US)

( * ) Notice: Subject to any disclaimer, the term of this patent is extended or adjusted under 35 U.S.C. 154(b) by 0 days.

(21) Appl. No.: 11/278,518

(22) Filed: Apr. 3, 2006

(51) Int. Cl.
*B43K 29/00* (2006.01)
*B43K 5/16* (2006.01)
*G06M 11/00* (2006.01)
*G01D 15/16* (2006.01)

(52) U.S. Cl. ............................ 401/195; 401/99; 377/1; 377/15; 346/139 R; 346/143

(58) Field of Classification Search ................ 401/195, 401/99–117; 377/1, 15; 346/139 R, 140.1, 346/143, 139 C, 141
See application file for complete search history.

(56) References Cited

U.S. PATENT DOCUMENTS

| | | | | | |
|---|---|---|---|---|---|
| 3,064,888 | A | * | 11/1962 | Van De Mark | 377/55 |
| 3,120,924 | A | * | 2/1964 | Van De Mark | 235/91 R |
| 4,768,040 | A | * | 8/1988 | Pipkin et al. | 346/14 R |
| 4,833,697 | A | * | 5/1989 | Perna et al. | 377/15 |
| 5,506,876 | A | * | 4/1996 | Homer | 377/15 |
| 5,646,975 | A | * | 7/1997 | Homer | 377/15 |
| 5,995,123 | A | * | 11/1999 | McCormick | 346/14 MR |

* cited by examiner

*Primary Examiner*—David J. Walczak
(74) *Attorney, Agent, or Firm*—Schwegman, Lundberg, Woessner & Kluth, P.A.

(57) ABSTRACT

An apparatus and method provide a writing device including a button pressed by a user, wherein the button engages a mechanism used to move a writing tip between stowed and operative positions. A counter receives at least one indication each time the button is pressed by a user. A display on the writing device indicates a count kept by the counter.

8 Claims, 4 Drawing Sheets

COUNTING PEN

FIELD

Embodiments of the inventive subject matter relate generally to writing devices, and more particularly, to a writing device including a counting mechanism.

BACKGROUND

Ball point pens and similar devices are used daily by hundreds of millions of people, including a large population of school aged children and young adults.

DETAILED DESCRIPTION

In the following detailed description, reference is made to specific examples by way of drawings and illustrations. These examples are described in sufficient detail to enable those skilled in the art to practice the inventive subject matter, and serve to illustrate how the inventive subject matter may be applied to various purposes or embodiments. Other embodiments are included within the inventive subject matter, as logical, mechanical, electrical, and other changes may be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Figure 1A:
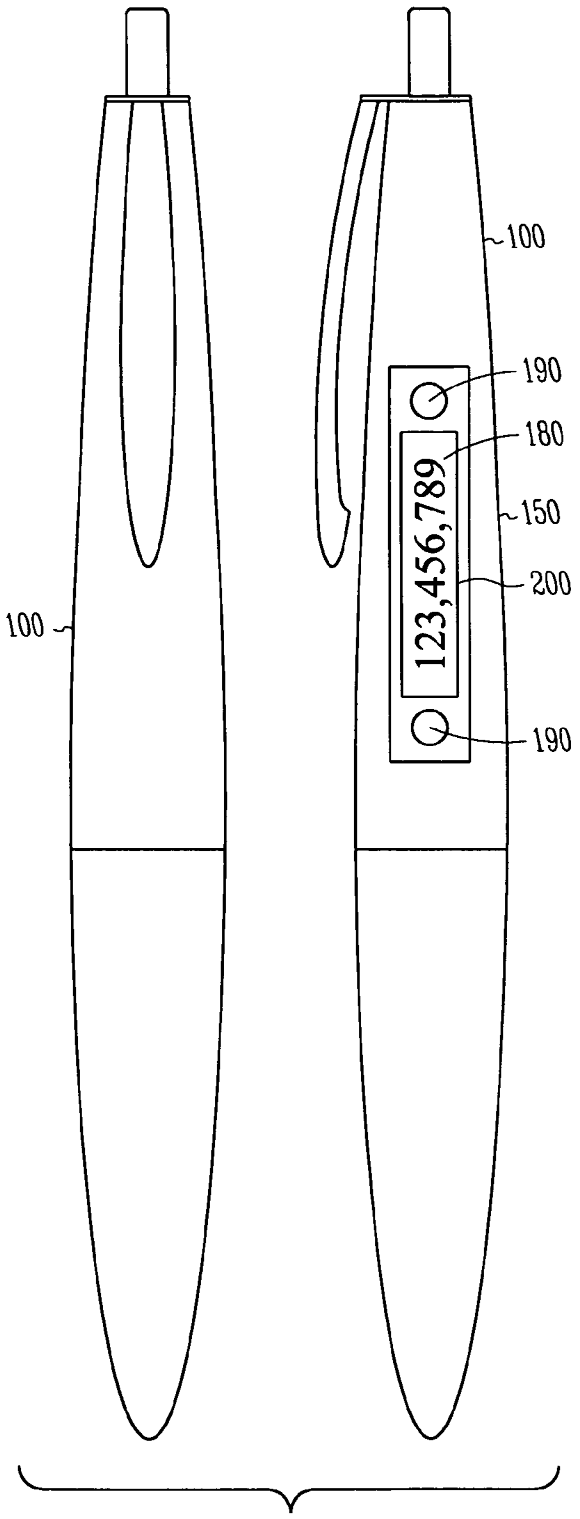
FIGS. 1A, 1B and 1C illustrate several embodiments of a writing device according to example embodiments of the inventive subject matter disclosed herein.
Figure 1B:
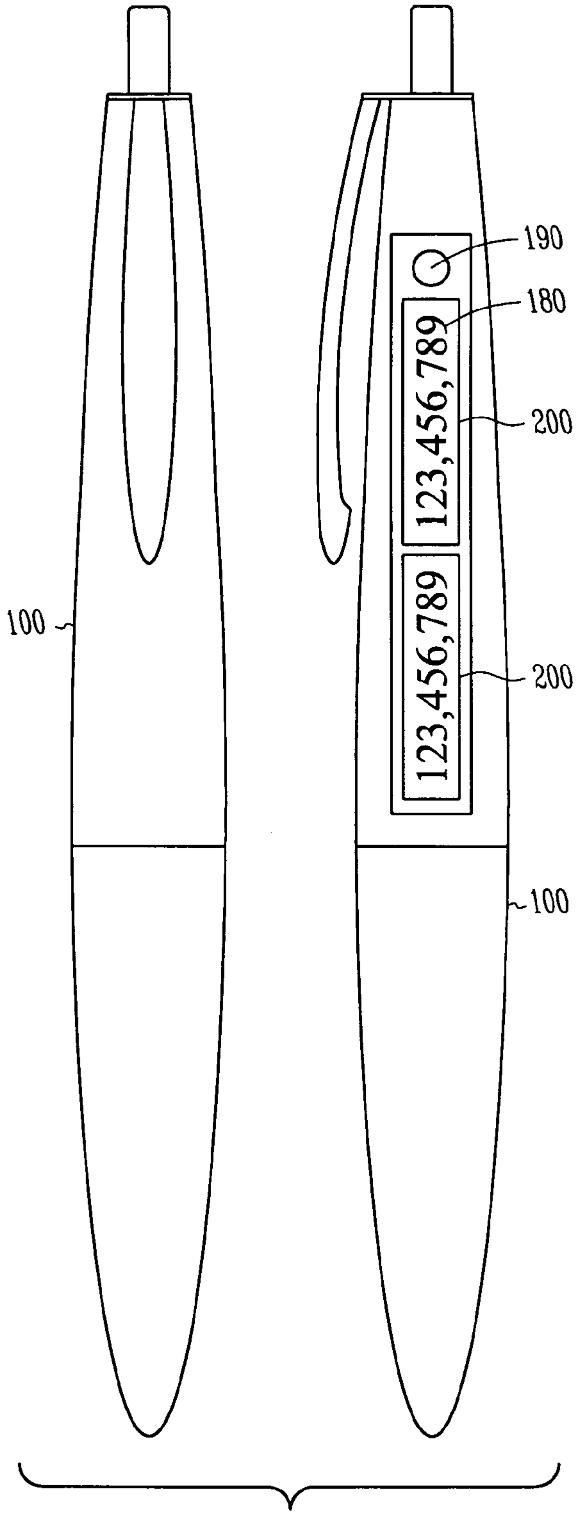
Figure 1C:
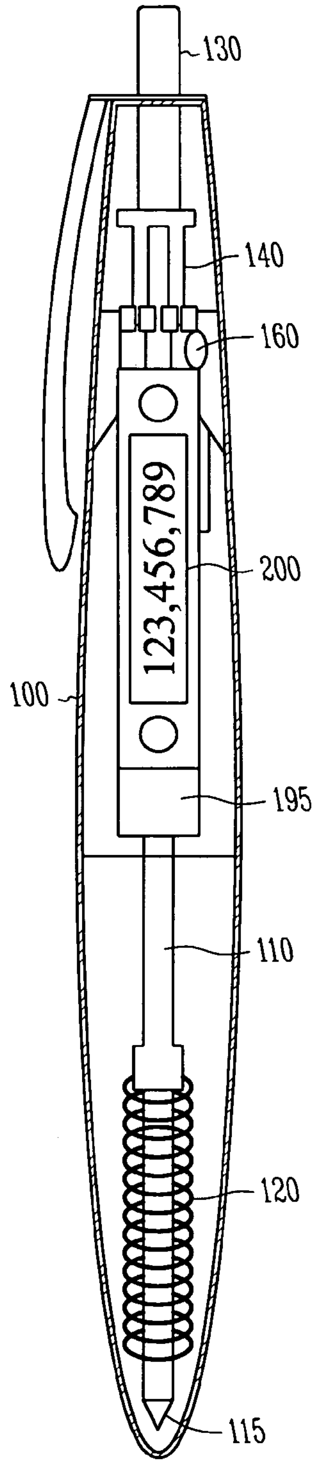

Referring now to FIGS. 1A, 1B, 1C and 2, there is illustrated a first embodiment of a writing device 100, for example a ball point pen, according to one example embodiment of the inventive subject matter. As shown in FIG. 1C, the internal components of the writing device 100 include an ink stylus 110 with a writing tip 115, a spring 120, a button 130 and a latch or locking mechanism 140 positioned somewhere in housing 150. In operation, according to one example embodiment, the device 100 acts like a common ball point pen in that the user presses the button 130 to cause the tip 115 to either protrude outwardly from the pen housing 150 and lock into a position where the pen can be used for writing, or by pushing the button 130 again, unlock the ink stylus from its writing position and retract it back into the pen housing 150 in a stowed position. According to one example embodiment, each time the button 130 is depressed, the pen may make a "clicking" sound. In addition, the writing device further includes a contact switch 160 that is closed each time the button 130 is depressed. Switch 160 in turn provides an electrical input to an integrated circuit device 170 mounted in the housing 150. Integrated circuit device 170 drives a display 180 and also receives an input from one or two (or more) buttons 190 and has a power source 195, typically a battery, but also possibly a photocell, all mounted in or on the housing 150. Display 180, for example a LCD or LED display or any other type of display, is positioned so as to be viewable from an aperture 200 in the housing 150. Further, buttons 190 are also accessible through one or more apertures in the housing 150.

According to one embodiment, the writing device 100 with two displays, as shown in FIG. 1B, may have one "Reset Button" (one of buttons 190) whose only function would be to reset the reset-able counter 220 to zero. The perpetual counter display 230 would not be affected and would continue to record the total number of times the button 130 is depressed by the user (for example resulting in a clicking sound each time) since the device 100 was made or otherwise initialized, for example by holding down one of buttons 190 for a desired period of time. The reset-able counter would be reset by the Reset Button by pressing it or by pressing it and holding it a predetermined amount of time, or by other means of using the button.

The single display device 100 illustrated in FIG. 1A has two buttons (accomplished with buttons 190), for example a "Function Button" and a "Reset Button". The Function Button allows the user to switch between different "counter" and "optional" functions such as:

1. Perpetual counter—this function counts/displays the total number of times the button 130 was depressed since the pen was purchased (starting at "0" times the button 130 was depressed)

2. Reset counter—this function counts/displays each click, but can be reset to "0" by pressing the "Reset" button 3. Time—this optional function could display the time; when in the "Time" mode, the reset button would reset the hour and minutes.

4. Date—this optional function could display the date; when in the "Date" mode, the reset button would reset the day, month and year.

5. Timer—this optional function would allow the user to measure elapsed time; when in the "Timer" mode, the reset button would set the timer back to "0" with the first click, start the timer with a second click, stop the timer with a third click; the next time the button 130 is depressed would set the Timer back to "0", starting the sequence over again.

Figure 2:
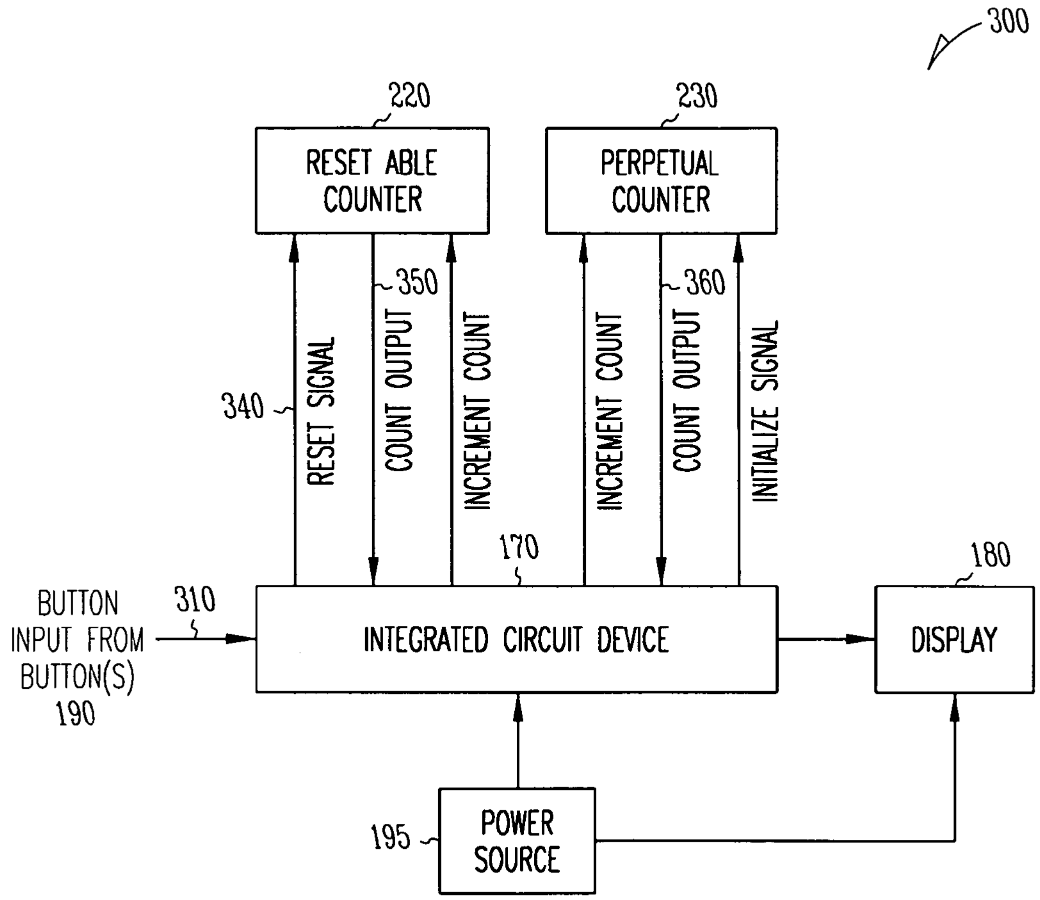
FIG. 2 is a block diagram according to one example embodiment of the inventive subject matter disclosed herein.

Referring now to FIG. 2, there is shown a simplified block diagram of a circuit 300 for the writing device 100 according to one example embodiment of the inventive subject matter. Circuit 300 includes at least one input 310 from the switch 160 that is fed to a first counter 320 and a second counter 330. A reset input 340 is received from one of the buttons 190, and is fed to the first counter 320 to reset it to zero. A first count signal 350 provides a count to use to drive at least one portion of the display 180, for example with the reset-able count of depressions of button 130, and a second count signal 360 provides a count to drive at least one other portion of the display 180, or the same portion at a different time, to show the cumulative count of depressions of the button 130.

Each of the embodiments described herein are contemplated as falling within the inventive subject matter, which is set forth in the following claims.

What is claimed is:

1. An apparatus comprising:

a writing device including a button pressed by a user;

wherein the button engages a mechanism used to move a writing tip between stowed and operative positions;

a counter receiving at least one indication each time the button is pressed by a user; and a display indicating a count kept by the counter.

2. Apparatus according to claim 1 further including a reset button that provides a reset signal to the counter.

3. Apparatus according to claim 1 further including the display indicating a count representing the total number of times the button has been pressed by a user since an initialization event corresponding to at least one of the first uses of the writing device.

4. Apparatus according to claim 1 further including the display indicating a count representing the total number of times the button has been pressed by a user since a reset event.

5. A method comprising using a counter to count the number of times a button on a writing device is pressed, wherein pressing the button causes the writing tip to move between stowed and operative positions, and displaying the number of times the button has been pressed on a display mounted on the writing device.

6. A method according to claim 5 further including using a reset button to reset the counter.

7. A method according to claim 5 further including the display indicating a count representing the total number of times the button has been pressed by a user since an initialization event corresponding to at least one of the first uses of the writing device.

8. A method according to claim 5 further including the display indicating a count representing the total number of times the button has been pressed by a user since a reset event.

* * * * *